(12) United States Patent
Rawlings

(10) Patent No.: US 7,525,785 B2
(45) Date of Patent: Apr. 28, 2009

(54) LIGHTNING STRIKE PROTECTION METHOD AND APPARATUS

(75) Inventor: Diane C. Rawlings, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 11/611,023

(22) Filed: Dec. 14, 2006

(65) Prior Publication Data

US 2008/0144249 A1    Jun. 19, 2008

(51) Int. Cl.
    H05F 3/00    (2006.01)
(52) U.S. Cl. .................................... 361/216
(58) Field of Classification Search ............... 361/218, 361/216, 217
    See application file for complete search history.

(56) References Cited

U.S. PATENT DOCUMENTS

| | | | |
|---|---|---|---|
| 3,989,984 A * | 11/1976 | Amason et al. ............ 361/212 |
| 4,428,867 A | 1/1984 | Billias et al. | |
| 6,451,441 B1 | 9/2002 | Nishimoto et al. | |
| 7,223,312 B2 * | 5/2007 | Vargo et al. ................... 156/71 |
| 2006/0051592 A1 | 3/2006 | Rawlings et al. | |
| 2006/0146473 A1 | 7/2006 | Heidlebaugh et al | |

FOREIGN PATENT DOCUMENTS

WO    WO02/024383    3/2002

OTHER PUBLICATIONS

International Search Report on corresponding PCT application (PCT/US2007/087493) from International Searching Authority (EPO) dated May 13, 2008.
Written Opinion on corresponding PCT application (PCT/US2007/087493) from International Searching Authority (EPO) dated May 13, 2008.

* cited by examiner

*Primary Examiner*—Stephen W Jackson
*Assistant Examiner*—Christopher J Clark
(74) *Attorney, Agent, or Firm*—Klein, O'Neill & Singh, LLP

(57) ABSTRACT

A method and apparatus for implementing a return current network that is external to a composite structure, which directs a current along a known path to the aircraft grounding system using appliqués. The appliqués have a dielectric polymer to isolate the return current from the structure, and a metal foil for conducting the current

13 Claims, 4 Drawing Sheets

LIGHTNING STRIKE PROTECTION METHOD AND APPARATUS

BACKGROUND

1. Field of the Disclosure

The present disclosure relates to an apparatus and method for both routing and dissipating electrical energy received by elements as a result of a lightning strike.

2. Related Art

The ability to effectively manage lightning strikes on composite materials that form structural panels for wings, fuselages, fuel tanks, and other components of an aircraft structure is an important consideration for the safety of an aircraft.

Composite materials are highly desirable for use as structural components due to their lower mass, while possessing excellent structural rigidity and high strength. However, composite materials are not highly conductive and cannot dissipate the energy from a lightning strike as efficiently as traditional metal body components used in many conventional aircraft.

Carbon fiber reinforced plastic (CFRP) is one type of composite material used for skin, spar and rib installations on aircraft. A CFRP structure is about 2000 times more resistive than most metals, and consequently CFRP is more prone to electrical breakdown when subjected to currents from lightning strikes, especially at interfaces and fasteners.

Moreover, protection is needed against lightning strikes for not only composite skins and underlying structures, but for sensitive equipment, like hydraulic lines and fuel tanks, as well.

Appliqué coatings, such as Lightning Strike Appliqué (LSA), which contain a thin metal foil, and Wide Area Lightning Diverter Overlay (WALDO), are used to protect aircraft. These coatings are described in detail in US Patent Application 2006/0051592, which is incorporated herein by reference.

When using a lightning protection approach, such as LSA/WALDO, to protect the composite structure it is important to reliably transition the current that is carried by or on the appliqué coating system to a grounded metallic structural component or current return network.

Typical current return networks used on aircraft are buried inside the structure. This solution forces a designer to drive high electrical currents into the skin and composite structure itself. High currents damage sites at each electrical discontinuity, including fasteners, joints, fiber interfaces, panel edges, and the like, as well as creating hot spots, edge-glow or sparks, which, for example, could ignite the fuel within the wing box.

The difficulty of predicting where currents go once an aircraft is struck by lightning, leads to over-designing many areas of the structure and to the duplication of protection schemes.

SUMMARY

The present disclosure provides a lightning strike protection method and apparatus for implementing a return current network. The return current network can be made external to a composite surface structure by using appliqués that have a dielectric polymer to isolate the return current from the structure, and a metal foil for conducting the current.

In one aspect of the present disclosure, an apparatus is provided that combines LSA and/or WALDO with a current return network to provide a deterministic lighting protection scheme. The combination allows effective control of the current and current-path. A reliably predictable current path helps eliminate many of the hazards associated with driving current into the composite structure or into a buried current return network.

A layout for the external current return network is flexible. It allows any desired location to become a direct access point from the surface conductor to the grounding system of the aircraft. The layout may be configured, as needed, for the protection of any particular aircraft or part.

The network allows designing a lightning protection scheme that keeps nearly all of the direct-effects energy out of the composite structure.

The present disclosure provides an improved and simplified lightning protection for aircraft, due to the use of a deterministic lightning protection scheme. It improves flight safety, reduces the overall weight of the lightning protection scheme, improves repairability, and supportability. When used as a paint replacement it can further reduce aircraft weight.

The present disclosure, in combination with LSA and WALDO, can safely eliminate the use Inter Woven Wire Fabric (IWWF), Copper grid (Cu-Grid), and expanded aluminum foil (EAF) as part of a lightning control scheme Since the coefficient of thermal expansion (CTE) of these materials are incompatible with composite structures they are sources of composite cracking.

This brief summary has been provided so that the nature of the disclosure may be understood quickly. A more complete understanding of the disclosure can be obtained by reference to the following detailed description of the embodiments thereof in connection with the attached drawings.

BRIEF DESCRIPTION OF THE DRAWINGS

The foregoing features and other features of the present disclosure will now be described with reference to the drawings. In the drawings, the same components have the same reference numerals. The illustrated embodiments are intended to illustrate, but not to limit. The drawings include the following Figures.

Hereinafter, embodiments of the present disclosure are described with reference to the accompanying drawings.

DETAILED DESCRIPTION

The present disclosure provides a method and an apparatus for creating a current return network that is external to a composite body, specifically a composite aircraft body.

As used herein, an "appliqué" or "decal" is a substrate that can be placed on to another surface upon contact. Appliqués may be applied to complex curved surfaces, or as an alternative to paint covering the entire exterior surface. Appliqués are normally manufactured as a flat material that is flexible and capable of limited elongation. This form of appliqué may be attached to flat and simple or complex curved surfaces. Appliqués may also be pre-molded for use on highly complex surfaces.

This disclosure provides a system that combines an external current return network with LSA and WALDO technology. In this new combination, the metallic/polymer layer in LSA and WALDO provide a shield to disperse the energy of the lightning strike, electrical isolation over the structure's fasteners and joints, and with the underlying external current return network provide a known current path for the lightning energy, for example, the grounding system of the aircraft.

Figure 1:
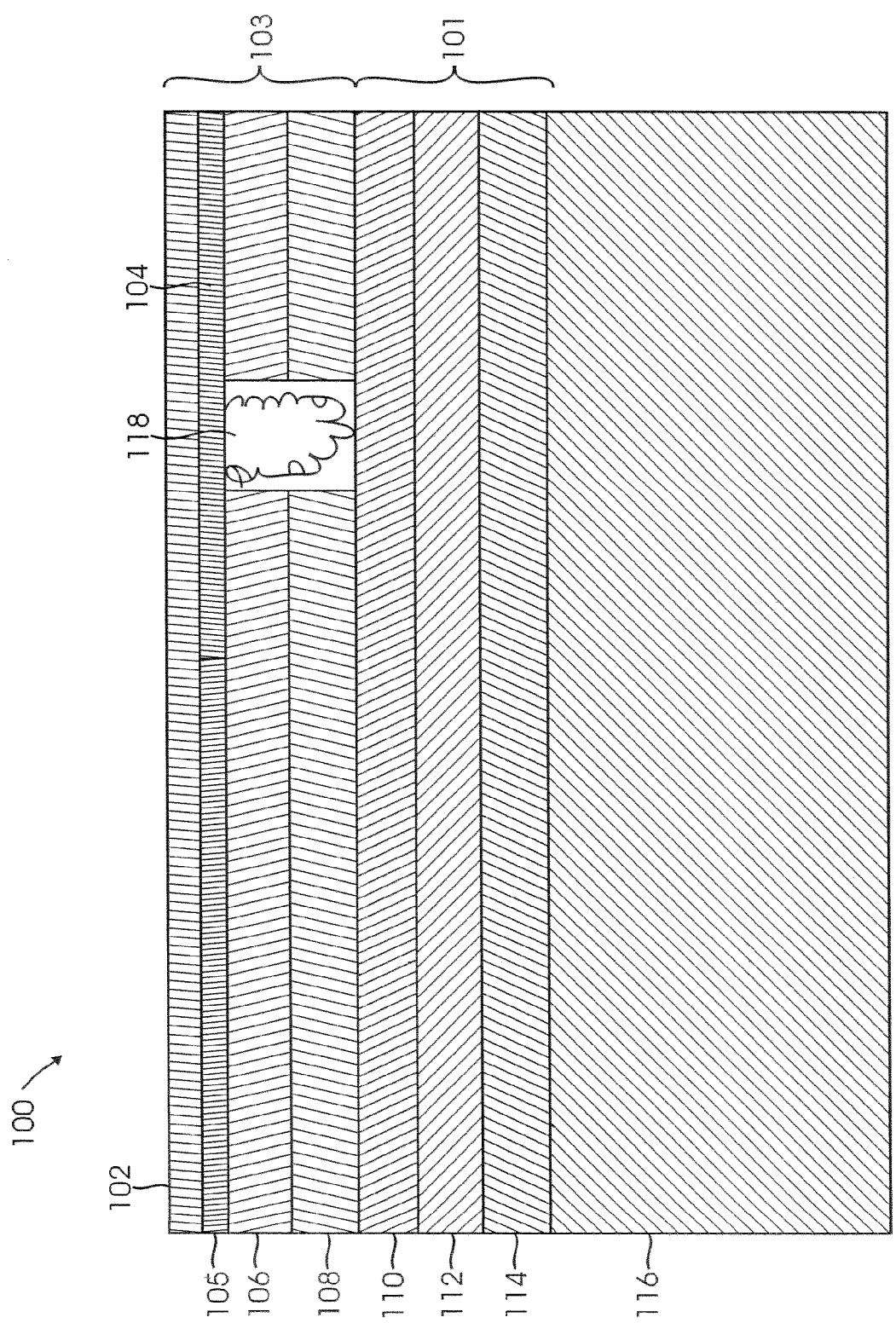
FIG. 1 is a cross section view of an external current return network and other associated layers, as it is applied to a composite panel, in accordance with an embodiment.

FIG. 1 is a cross section view of an external current return network and other associated layers (hereinafter "structure 100"), applied to a composite panel 116, in accordance with an embodiment. Structure 100 includes current return network 101 and LSA structure 103 applied external to a composite panel 116.

In one embodiment, external current return network 101 includes a foil 110, such as an aluminum foil or the equivalent, and a dielectric layer 112, such as a polymer-based dielectric. The dielectric layer provides electrical insulation and standoff from composite panel 116, and any discontinuities in the aircraft body, such as fasteners or joints.

A pressure sensitive adhesive (PSA) 114 or other adhesive like a heat-activated adhesive or heat reactive polymer may be used to attach current return network 101 to composite panel 116. PSA 114 adhesives are commercially available, for example, adhesive "A8" is available from the Boeing Company of Seattle, Wash. or "52-4" or "86-02" available from the 3M Company of St. Paul, Minn.

As shown in FIG. 1, LSA structure 103 is layered over current return network 101. In one embodiment, LSA structure 103 includes an electrically conductive foil 104, a polymer-based dielectric layer 106, and an adhesive layer 108, typically a PSA. The PSA layer 108 bonds LSA structure 103 to current return network 101.

As also shown in FIG. 1, LSA structure 103 includes a plurality of electrical connecting means 118, which provide an electrical coupling between conductive foil 104, in LSA structure 103, and foil 110 of current return network 101. Electrical connecting means 118 may include a variety of electrical connectors all commercially available and well known in the art. In one example, electrical connecting means 118 includes a Fuzz Button® made from a single gold plated fine wire that is compressed into a very small cylindrical shape. The resulting object is a wire mass having spring performance and demonstrated superor electrical signal conduction from high current DC to microwave frequencies.

In yet another embodiment, HOLE-type connectors may be used to funnel lightning currents (high current/voltage) in the event of a strike.

Alternatively, conductive adhesives such as a filled epoxy or PSA could be used to provide an electrical coupling between conductive foils 104 and foil 110.

Electrically non-conductive regions, WALDO 105 may be incorporated into LSA structure 103, replacing conductive foil 104 over sensitive areas. These non-conductive regions WALDO 105 may help prevent high currents from destroying critical structure or from accessing fasteners, which penetrate composite fuel tanks, thereby reducing sparking and explosion hazards. WALDO 105 could be used to help reduce induced currents on sensitive internal equipment, structure, hydraulic lines, or electrical lines by tailoring the current flow to travel on regions of the exterior surfaces away from such areas or equipment.

A topcoat 102 may be layered over LSA structure 103. In one embodiment, topcoat 102 includes a polymer film with semiconductor particulates dispersed therein to contribute to instantaneous generation of localized coronas. In addition, an ink layer may be provided between the patterned metal foil and the topcoat or on the exterior, if desired, for aesthetic and/or anti-static purposes.

Figure 2A:
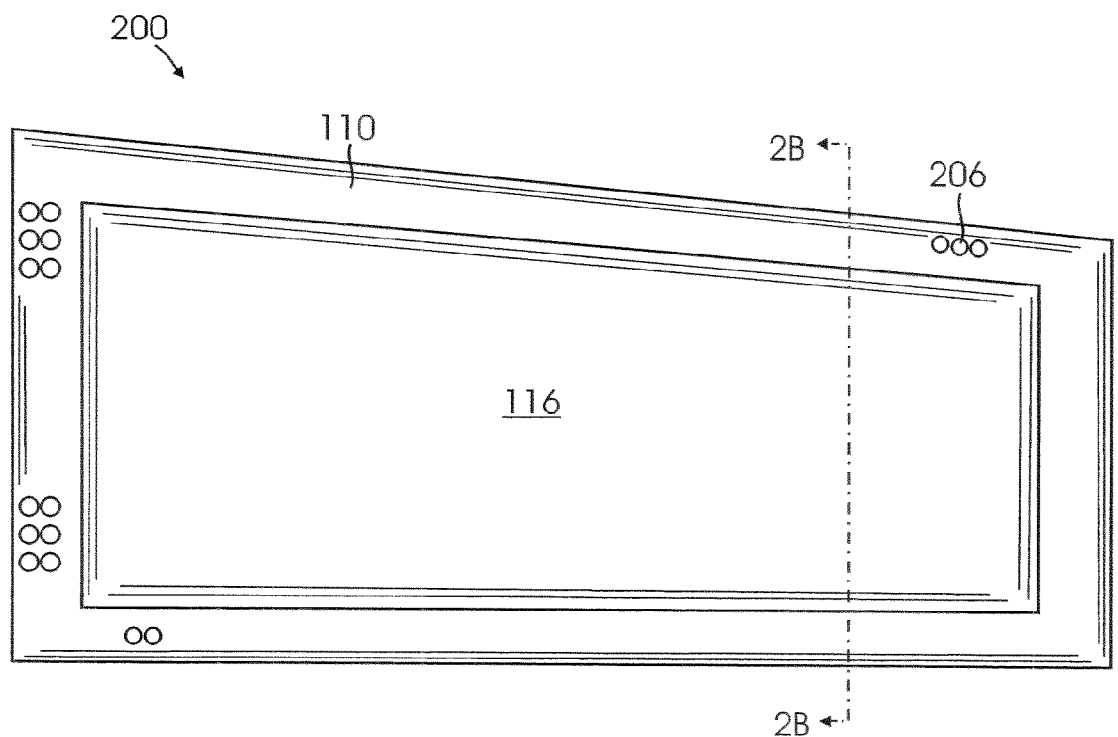
FIGS. 2A and 2B are top and sectional views, respectively of a model wing with applied current return network in accordance with an embodiment.
Figure 2B:
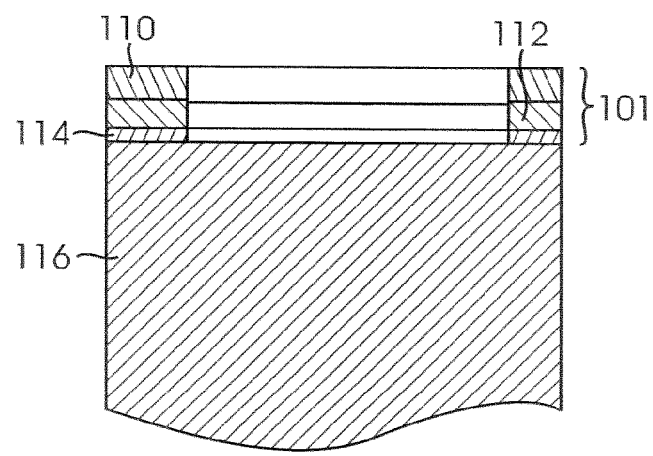

FIGS. 2A and 2B show current return network 101 bonded to composite panel 116. In one embodiment, electrical connection means 118 are provided at four locations 206 to couple current return network 101 to overlying LSA structure 103.

Figure 3A:
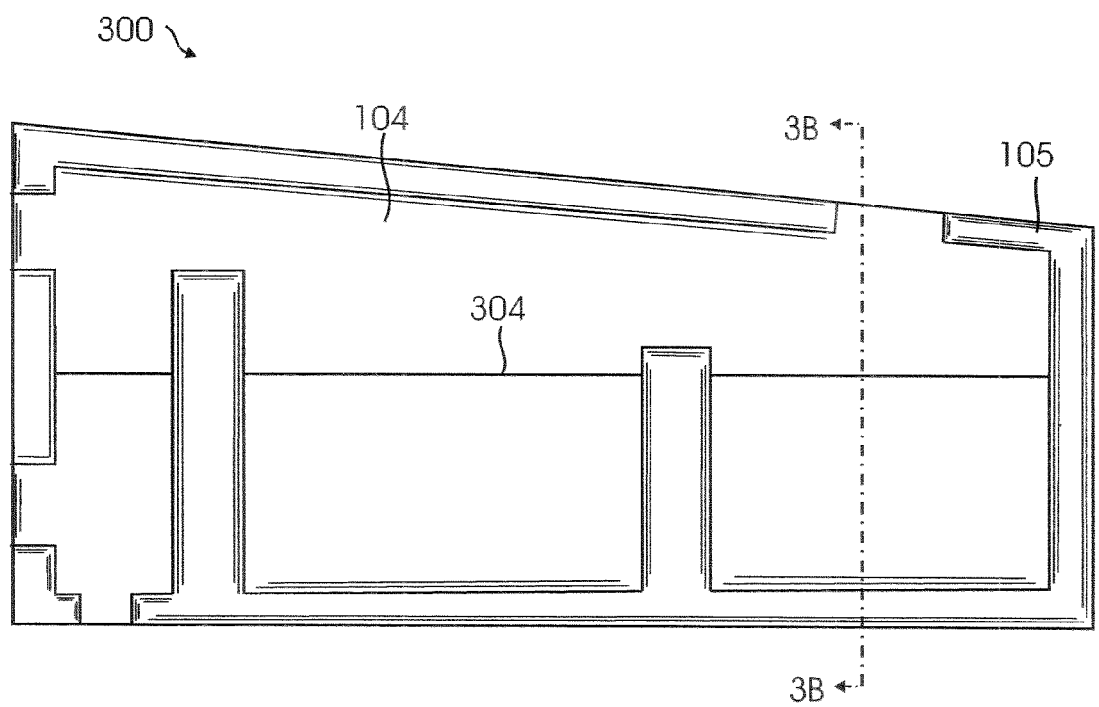
FIGS. 3A and 3B are top and sectional views of a model wing using LSA and WALDO and an underlying external current return network, in accordance with an embodiment.
Figure 3B:
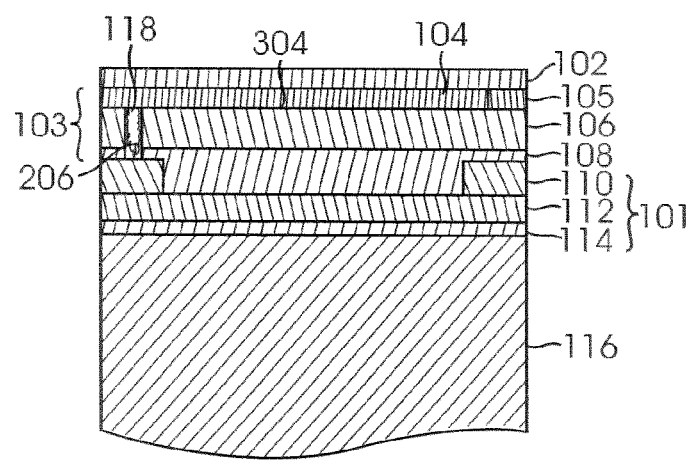

FIGS. 3A and 3B show a model wing 300 that is built according to an embodiment, using conductive foil 104, and WALDO 105, and an underlying external current return network 101.

The non-conductive metallic/polymer layer WALDO 105 is designed on the structure to provide an electrical isolation over sensitive areas and structures, like electrical discontinuities, including fasteners, joints, fiber interfaces, panel edges, and the like.

Application of WALDO 105 also serves to direct or steer lightning current away from sensitive areas into current return network 101, via a plurality of electrical contacts pads 206, and connection means 118. When lightning hits a surface of composite panel 116 protected by LSA structure 103, conductive foil 104 and WALDO 105 respectively, the surface current thus created is conducted by metal foil 104. The portions protected by WALDO 105 prevent current flow over sensitive areas. Current directed from conductive foil 104 flows both along the LSA path and to underlying external current return network 101.

Figure 4:
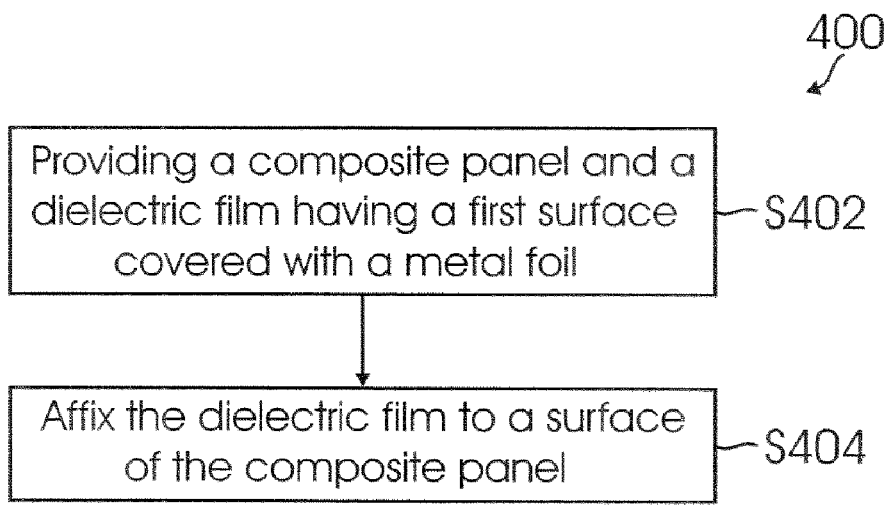
FIG. 4 is a flow chart of a method for forming an external current return network, in accordance with an embodiment.

FIG. 4 shows a flow chart of a method 400, for constructing an external current return network. In step S402 a composite panel 116 and dielectric film is provided. In step S404, the dielectric film is affixed to the composite panel.

Figure 5:
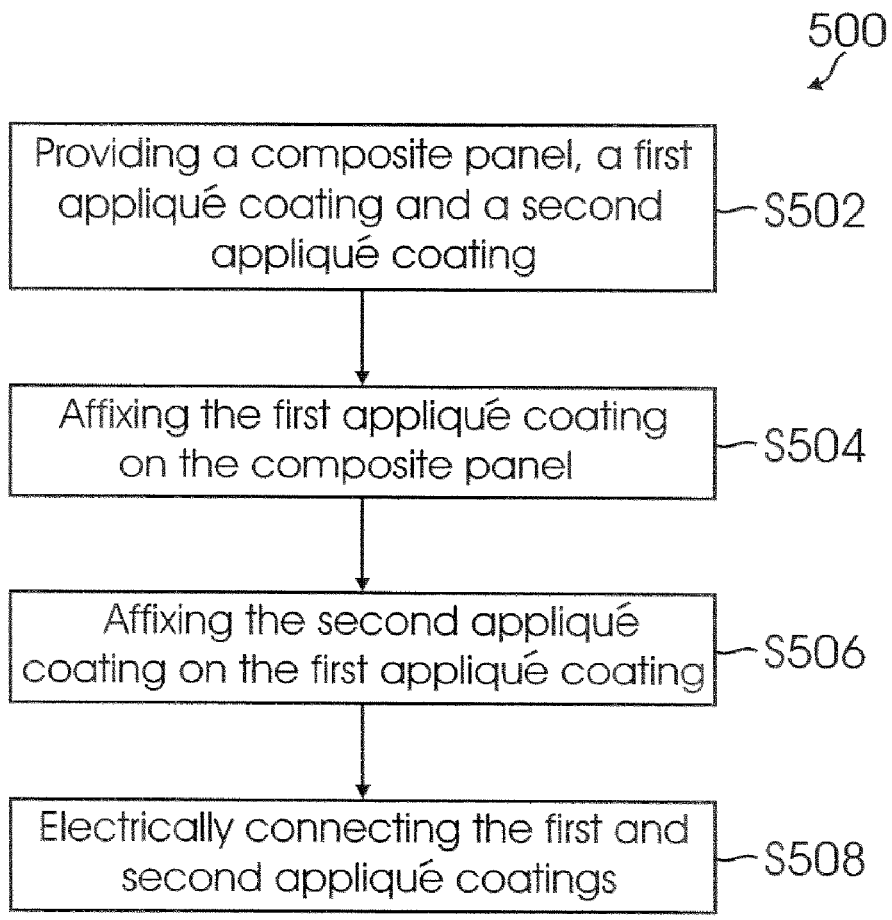
FIG. 5 is a flow chart of a method for forming a structure combining an external current return network with LSA and WALDO, in accordance with an embodiment.

With reference to FIG. 5, method 500 illustrates the steps of creating a structure that combines an external current return network with LSA structure 103. In step S502 a composite panel 116, a first appliqué coating 101 and a second appliqué coating 103 is provided. In step S504, the first appliqué coating 101 is affixed to the composite panel 116. In step S506, the second appliqué coating, LSA structure 103 is affixed to the first appliqué coating 101. The second appliqué 103 is affixed to the first appliqué 101 in regions covered by the external current return network. In other regions, the second appliqué 103 is adhered to the surface of the structural panel. In step S508 the first and second appliqué coatings are electrically connected While the disclosed technology has been shown and described with reference to certain preferred embodiments thereof, it will be understood by those skilled in the art that various changes in form and details may be made therein without departing from the spirit and scope of the disclosure as defined by the appended claims.

What is claimed is:

1. An external current return network for lightning strike protection comprising:
   a composite structural panel;
   a first appliqué coating on an external surface of the composite structural panel including a first conductive foil and a first dielectric layer;
   a second appliqué coating on said first appliqué coating, said second appliqué coating including a second conductive foil and a second dielectric layer; and
   electrical connect means coupling said first conductive foil to said second conductive foil;

wherein the first appliqué coating is oriented such that the first dielectric layer is between the first foil layer and the composite structural panel, and the second appliqué coating is oriented such that the second dielectric layer is between the second foil layer and the composite structural panel; and further wherein the electrical connect means is electrically isolated from the composite structural panel.

2. The current return network of claim 1, wherein the first and second conductive foils comprise aluminum.

3. The current return network of claim 1, wherein the first and second dielectric layers comprise a polymer.

4. The current return network of claim 1, further comprising at least one electrically non-conductive region replacing a predetermined area of the second appliqué coating.

5. The current return network of claim 1, further comprising a first adhesive to bond the first coating to a surface of the structural panel.

6. The current return network of claim 1, wherein the electrical connect means comprises at least one of a fuzz button, a HOLE-type connection and a conductive adhesive.

7. The current return network of claim 1, wherein the first dielectric layer provides electrical isolation between said first conductive foil and a surface of the structural panel.

8. A method of forming an external current return network for lightning strike protection, the method comprising the steps of:

applying a first appliqué coating on an external surface of a composite structural panel, the first appliqué coating including a first conductive foil and a first dielectric layer;

applying a second appliqué coating on the first appliqué coating, the second appliqué coating including a second conductive foil and a second dielectric layer; and electrically connecting the first and second conductive foils with an electrical connecting means;

wherein the first appliqué coating is oriented such that the first dielectric layer is between the first foil layer and the composite structural panel, and the second appliqué coating is oriented such that the second dielectric layer is between the second foil layer and the composite structural panel; and further wherein the electrical connect means is electrically isolated from the composite structural panel.

9. The method of claim 8, wherein connecting the first and second appliqué coatings forms an electrically contiguous current return structure that is exterior to the composite structural panel.

10. The method of claim 8, wherein the connecting means comprises at least one of a fuzz button, a HOLE-type connection and a conductive adhesive.

11. The method of claim 8, wherein the first and second conductive foils comprise aluminum.

12. The method of claim 8, wherein the first and second dielectric layers comprise a polymer.

13. The method of claim 8, further comprising the step of forming at least one electrically non-conductive region in a predetermined area of the second appliqué coating.

* * * * *